United States Patent [19]
McClanahan

[11] Patent Number: 5,374,195
[45] Date of Patent: Dec. 20, 1994

[54] TALKING BOOK

[75] Inventor: Susan D. McClanahan, New York, N.Y.

[73] Assignee: McClanahan Book Company, Inc., New York, N.Y.

[21] Appl. No.: 60,050

[22] Filed: May 13, 1993

Related U.S. Application Data

[63] Continuation-in-part of Ser. No. 953,231, Sep. 30, 1992, Pat. No. 5,290,190.

[51] Int. Cl.⁵ .................................................. G09B 5/00
[52] U.S. Cl. ....................................................... 434/317
[58] Field of Search ............... 434/308, 317, 311, 309; 40/594, 595

[56] References Cited

U.S. PATENT DOCUMENTS

| | | | |
|---|---|---|---|
| 3,592,098 | 7/1971 | Zadig | 84/483 |
| 3,738,686 | 6/1973 | Morse | 281/33 X |
| 4,021,932 | 5/1977 | Lipps | 434/317 |
| 4,363,081 | 12/1982 | Wilbur | 434/317 X |
| 4,497,126 | 2/1985 | Dejean | 40/124.1 |
| 4,636,881 | 1/1987 | Brefka et al. | 434/317 X |
| 4,703,573 | 11/1987 | Montgomery et al. | 40/455 |
| 4,752,230 | 6/1988 | Shimizu | 434/317 |
| 4,809,246 | 2/1989 | Jeng | 434/317 |
| 4,819,963 | 4/1989 | Wolski | 283/64 X |
| 4,990,092 | 2/1991 | Cummings | 434/317 |
| 5,167,508 | 12/1992 | McTaggart | 434/317 |
| 5,209,665 | 5/1993 | Billings et al. | 434/169 |

FOREIGN PATENT DOCUMENTS

| | | | |
|---|---|---|---|
| 3140735 | 4/1983 | Germany | 235/494 |
| 213037 | 4/1990 | Japan | 434/169 |
| 9106090 | 5/1991 | WIPO . | |

Primary Examiner—Gene Mancene
Assistant Examiner—Jeffrey A. Smith
Attorney, Agent, or Firm—Rogers & Killeen

[57] ABSTRACT

A talking book and a method of making a talking book in which the switches that operate the book's audio system are carried by inserts placed in lateral channels in the pages of the book that are accessible from the binding-facing edge of the pages. Each page may include a core with an aperture overlain with informational sheets to form a channel, and an insert may be placed into the channel after the informational sheets have been added. The method provides flexibility in locating the switches on the page and prevents inadvertent activation of a switch from another page.

20 Claims, 2 Drawing Sheets

TALKING BOOK

BACKGROUND OF THE INVENTION

This is a continuation-in-part application of copending application Ser. No. 953,231 (now U.S. Pat. No. 5,290,190) entitled TALKING BOOK filed Sep. 30, 1992 by the inventor hereof that is assigned to the assignee hereof.

Talking books are well known and generally include a plurality of pages of printed material, (i.e., pictures and/or text) and a plurality of voice chips selectively activated by switches operable by the reader as she or he turns the pages to access the printed material.

Known talking books place the switches for activating the voice chips in or on the pages and carry an audio system (usually consisting of voice chips and a speaker) on a back cover. For example, it is known to use a printed circuit board as a core of each page of the book and to cover the circuit board with informational sheets. The circuit board has automatic and manual switches for providing a myriad of functions (e.g., lights, sounds, sequenced displays, etc.) and is connected to an electronics package on the back cover. See, U.S. Pat. No. 5,167,508 issued Dec. 1, 1992 to McTaggart. The advantages afforded by such a book include flexibility in placing the switches in diverse locations on a page to match the printed material, and prevention of inadvertent operation of a switch on another page. However, as will be appreciated by those engaged in the manufacture of talking books, the complexity and cost of manufacturing a book with a printed circuit board in each page will likely drive the book out of the traditional market for low to medium cost children's books.

Other types of talking books include all of the switches mounted on a back panel with other electronic components, the switches being operated through the pages by pressing predetermined marks on the various pages. While these books are less complex and less costly to manufacture, they do not afford much flexibility in placing the switches and do not prevent inadvertent operation of the wrong switch (a switch unrelated to the printed material on the page through the switch was operated.) In addition, such books require that the reader risk a loss of continuity in the story by diverting attention from the material on the page to a separate audio unit.

It is accordingly an object of the present invention to obviate many of the deficiencies of known talking books and to provide a novel talking book and a method for making a talking book that provides flexibility in the placement of the switches that control the operation of the voice chips without the high cost heretofore attendant therewith.

It is another object of the present invention to provide a novel talking book and a method of making a talking book in which the switches that control the operation of the voice chips are carried by inserts placed in channels in the pages of the book, and in which selected switches may be operative from opposite sides of the page.

It is yet another object of the present invention to provide a novel method of making a talking book in which the switches are carried by inserts placed into channels in the core of the page after the page has been overlain with informational sheets.

It is still another object of the present invention to provide a novel talking book in which switches carried by the pages of the book are carried by inserts placed in lateral channels that open to the binding-facing edges of the pages.

It is a further object of the present invention to provide a novel talking book and method in which conventional insulated wiring may be used instead of flexible wiring subject to breaking upon repeated flexure, and in which wiring however may be prepared independently of the literary content of the book and the desired location of the switches on the pages thereof.

These and many other objects and advantages of the present invention will be apparent to one skilled in the art from a perusal of the claims when read in conjunction with the drawings and following detailed description.

DETAILED DESCRIPTION OF THE PREFERRED EMBODIMENTS

Figure 1:
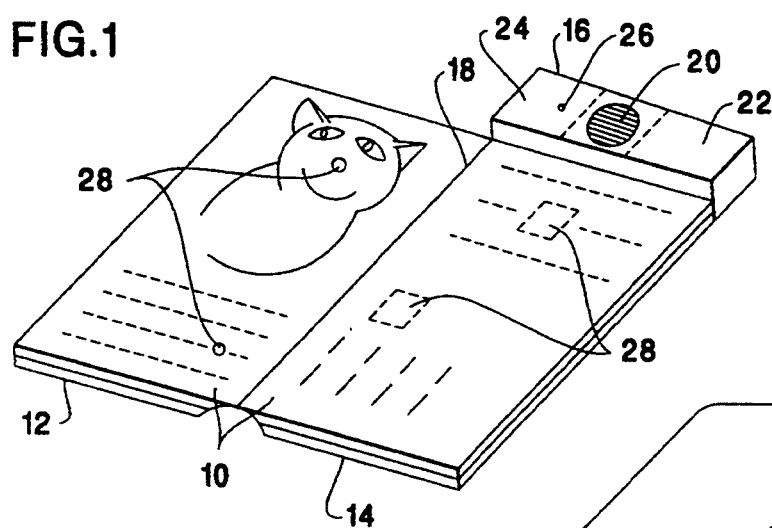
FIG. 1 is a pictorial illustration of one embodiment of the talking book of the present invention.
Figure 2:
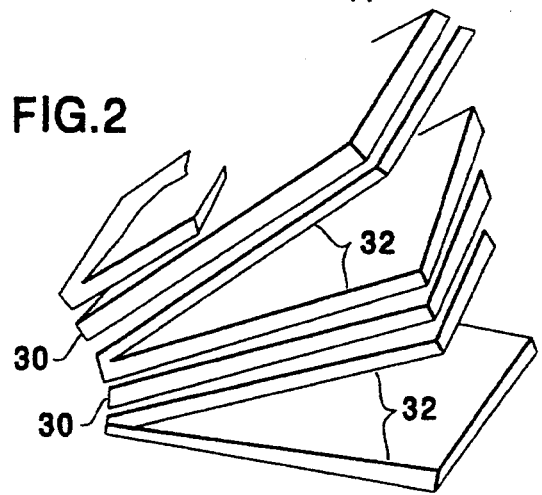
FIG. 2 is an exploded pictorial illustration of one embodiment of the binding of the talking book of the present invention.

With reference to FIG. 1, a preferred embodiment of the talking book of the present invention includes a plurality of pages 10, a front cover 12, a back cover 14, and a housing 16 for an electronics system. As is well known in the art, the pages 10 may be bound with a binding 18 in any suitable conventional manner, typically by interconnection of the adjacent pages as shown in FIG. 2.

Figure 4:
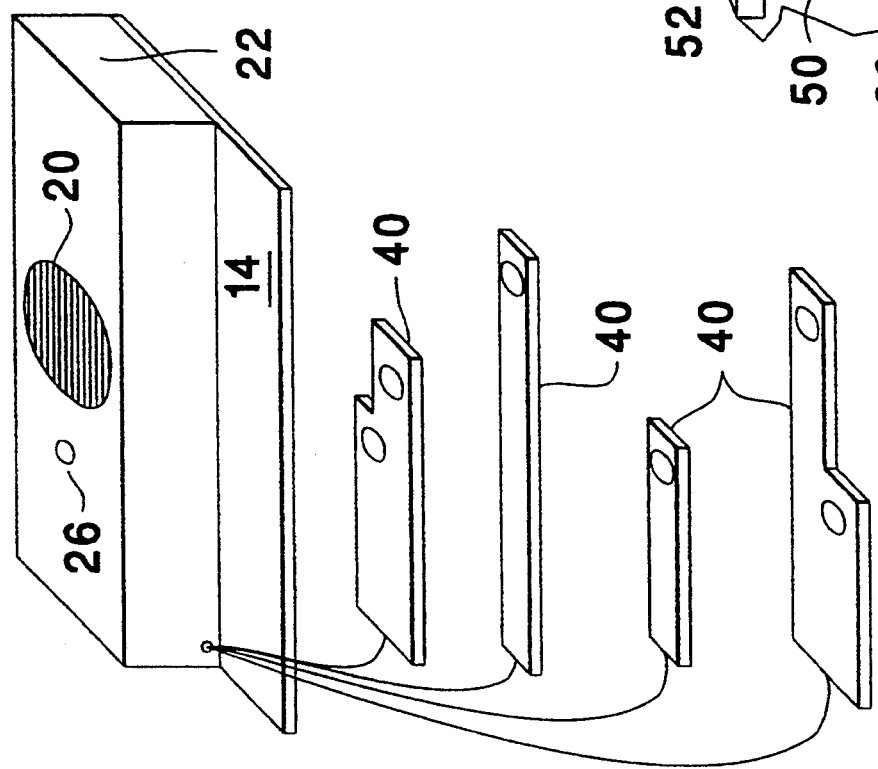
FIG. 4 is a pictorial illustration of a wiring harness suitable for several books of differing story content.

The electronics system may include a speaker 20, a source of power 22 (e.g., a battery, solar cells), and conventional circuitry 24 for producing an audible signal, such as words, music or sounds. The electronics system may be mounted at the top of the back cover 14 as illustrated in FIGS. 1 and 4 or, along the spine 18 (not shown), or both. A power switch 26 may be provided that operates manually or that operates automatically when the front cover 12 is opened or closed, such as by a tab found only on the cover or by a light triggered photoelectric cell.

The electronics circuitry 24 may be any suitable conventional circuit, and is referred to herein as "voice chips", although it is to be understood that the term encompasses one or more circuits by which certain predetermined sounds may be synthesized under the control of conventional logic circuitry, all under the control of switches associated with the individual pages. By the use of read-only-memory devices and an appropriate logic circuit, the sounds for various switches may be synthesized from a relatively small number of tone producing components.

The source of power 22 may be connected in any suitable conventional manner (not shown) to both the speaker 20 and the voice chips 24, and a switch may be provided to test the operation of the circuit and to provide an invitation to the reader to turn the pages.

As illustrated in FIG. 1, each of the pages 10 may be provided with one or more switches 28 to control the operation of one or more of the voice chips 24. The switches may be located on the page in positions consistent with the printed material thereon, and may be any suitable conventional manually operated switch, such as one responsive to the detection of the presence, by pressure, heat or otherwise, of a finger of a reader (all of which are referred to herein as pressure sensitive switches.) The switches are desirably located on each page so that they are not in registration with switches on underlying pages in order to prevent inadvertent activation of switches on the underlying pages.

The pressure sensitive switches 28 may be hidden from the reader with the surface activation areas thereof marked by the overlying printed material. Alternatively, the surface activation areas of the switches 28 may be made visible to the reader through a cut-out in the printed material.

Figure 3:
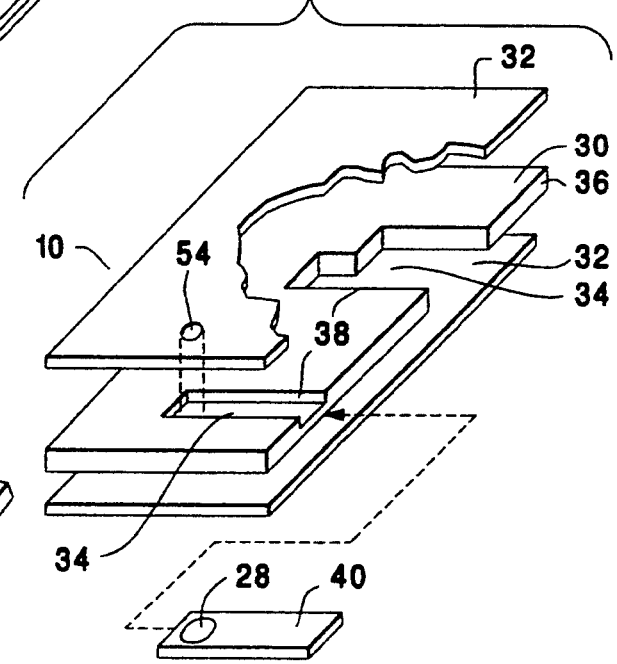
FIG. 3 is an exploded pictorial illustration of an embodiment of a page of the book of the present invention.

As illustrated in FIGS. 2 and 3, each of the pages 10 includes a core 30 of appropriate composition and thickness for the use intended (e.g., 0.5 to 1.5 mm thick cardboard for a children's book). Each face of the core 30 is covered with an informational sheet 32 that bears the printed material that conveys the theme of the book. The sheets 32 may be any thickness, with heavy paper preferred. The front cover 12 and the back cover 14 may also include switches 28, a core 30 and a cover sheet 32.

With further reference to FIG. 3, the core 30 includes one or more apertures 34 that extend laterally into the core from an edge 36 of the core. The edge 36 preferably faces the binding 18 when the page is joined thereto. As exemplified by the two apertures 34 shown in the core 30 of FIG. 3, the apertures 34 may have a depth less than or equal to the thickness of the core 30. As will be discussed below, each aperture accommodates an insert bearing one or more of the pressure sensitive switches 28, and to this end, each aperture 34 should extend laterally into the core sufficiently to allow placement of a pressure sensitive switch at the location mandated by the printed material on the sheet 32 that overlies the core 30.

In a preferred embodiment, core 30 is covered with the informational sheets 32 so that the apertures 34 form channels 38 before the pressure sensitive switches 28 are inserted. The pressure sensitive switches are carried by inserts 40 that slip into the channels 38, and to this end the inserts 40 are desirably rigid enough to allow them to be used to push the switches 28 into position. To enhance the appearance of the pages, each insert 40 may have a shape matching the channel into which it is placed so that the overlying sheet 32 appears relatively flat (e.g., without concavities.) One or more pressure sensitive switches 28 may be carried on one side of the insert 40 (such as illustrated in FIGS. 3, 4 and 6), or (with reference to FIGS. 4, 5 and 6) two switches 28 may be carried on opposing sides of the insert. As seen in FIG. 6 in which the thickness of insert 40 matches that of the core 30, an insert 40 may have one or more switches 28 selectively activated from the opposite sides of the page, e.g., switch 28A is upwardly facing for activation from the front of the page and switch 28B is downwardly facing for activation from the back of the page. The switches 28 may include a protective backing so that the switches are not inadvertently activated from the other side of the core, with the switch, including its backing, being about the same thickness as the channel into which it is placed.

Each of the switches 28 may be connected in any suitable conventional manner to the voice chips 24 by small diameter insulated wiring 42 or by flexible flat wiring such as screened on paper or plastic. In the preferred embodiment, the wires are individually insulated wires capable of repeated flexing without failure. This lends itself to the use of prefabricated wiring harnesses as illustrated in FIG. 4. With such harnesses, the text of different stories may be substituted providing increased flexibility in the production of multiple books in a series.

Figure 5:
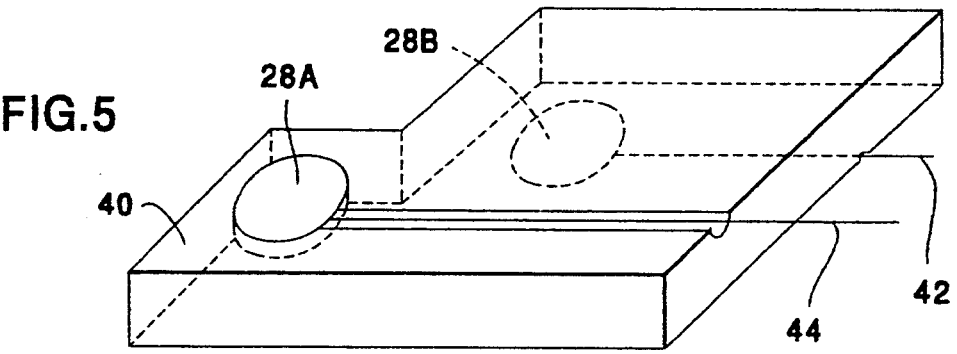
FIG. 5 is a pictorial representation of a two-sided insert of the present invention.
Figure 6:
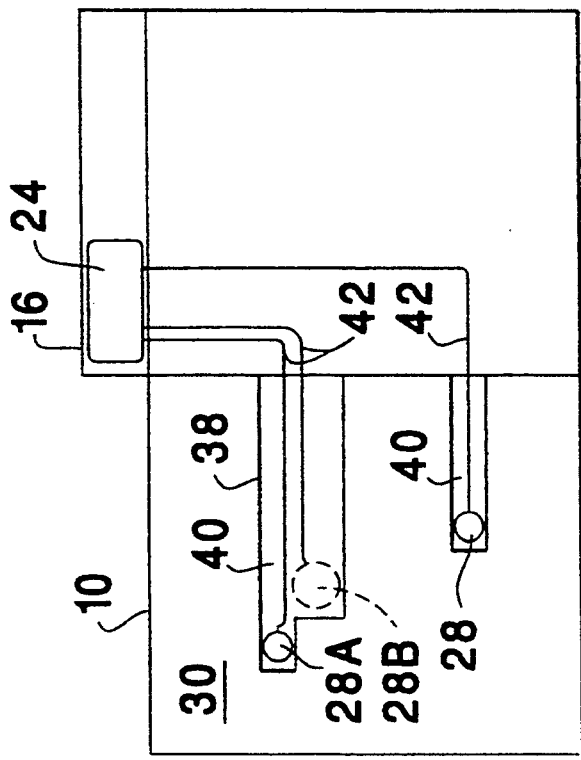
FIG. 6 is an overhead plan view of an embodiment of the present invention illustrating wire placement.

As illustrated in FIG. 5, the inserts 40 may have grooves 44 for the wires 42 so that the wires do not protrude in to the overlying sheet 32. With reference to FIG. 6, the wires may extend from the switch 28, across the length of the insert 40 and upwardly into the housing 22 where they are connected to the voice chips 24. As shown in FIG. 6 where the surfaces of the core 30 and the back cover 14 have been exposed to illustrate a wire path, the wires may be embedded in the back cover. Other wire paths may be used, such as along the spine 18 to the binding-facing side of the electronics housing 16.

Figure 7:
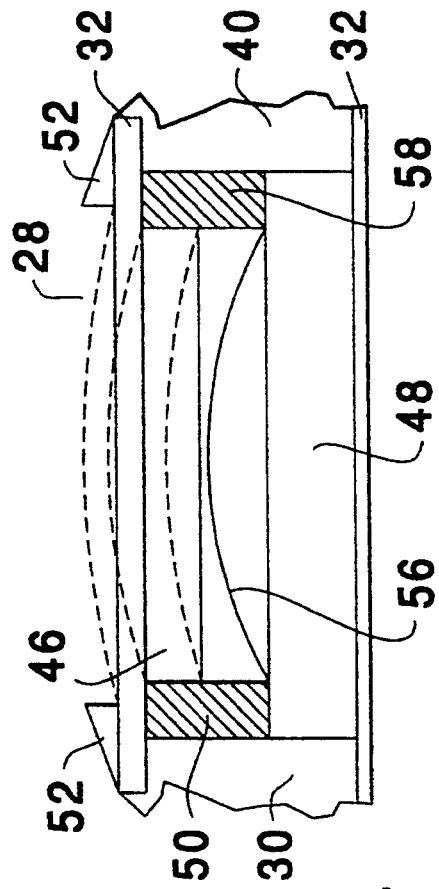
FIG. 7 is a vertical cross section of an embodiment of a switch of the present invention.

With reference now to FIG. 7, each pressure sensitive switch 28 may include an activation pad 46 and circuitry 48 for operation of the pad 46. A spacer 50 may be used as needed to fill out the space in which the pad 46 rests.

In an alternative embodiment, the pad 46 may protrude above the plane of the surface of core 30 so that the sheet bulges to locate the switch. To prevent activation of the switch when the pages are closed, a guard ring 52 may surround each protruding switch. Alternatively, the sheet 32 may have an opening corresponding to the switch 28 (see, for example, opening 54 in FIG. 3) and the pad 46 may protrude only to the plane of the surface of the sheet 32 so that a guard ring is not required. A spring mechanism 56 may be added to cause the pad 46 to protrude when the insert 40 is inserted into the channel 38 and the pad 46 is placed in registration with the opening 54.

The pages 10 may also contain one or more light emitting diodes separately connected to the switches 28 within the page, and that may be simultaneously operable with one of the voice chips under the control of one of the switches. The LEDs may be located within the page and may either be directly visible to the reader or covered with a translucent material in cut-outs within the page as back-lighting to illuminate a switch 28 (as exemplified by LED 58 in FIG. 7) or a portion of the illustrations or text shown on the page.

While preferred embodiments of the present invention have been described, it is to be understood that the embodiments described are illustrative only, and that the scope of the invention is to be defined solely by the appended claims when accorded a full range of equivalence, many variations and modifications naturally occurring to those skilled in the art from a perusal hereof.

What is claimed is:

1. A talking book comprising:
   a book with a plurality of pages of printed material, front and back covers and a binding for said pages and said covers;

an electronics housing carried by said back cover along the top edge thereof, said housing containing a speaker, voice chips and a power source, said voice and voice chips being operatively connected to said speaker means, voice and voice said power source supplying operating power to said voice and voice chips and to said speaker means;

each of said pages comprising, a core having an aperture extending generally parallel to the top and bottom edges of said page, said aperture being open to the binding lateral edge of said core and closed to the free lateral edge thereof, an informational sheet overlying a flat surface of said core to thereby define a channel with the top and bottom sides and closed end of said aperture, an insert having a thickness, width and length corresponding to the dimensions of the channel as defined above said insert including at least one pressure sensitive, manually operated switch adjacent the closed end of the channel as defined above, said switch having a thickness approximating the thickness of said core to thereby reduce the likelihood of inadvertent activation during the reading of the book, and said aperture being located in said core to position said switch consistent with the information on said sheet and out of registration with the switch on an underlying page to thereby reduce the likelihood of inadvertent operation of the switch on an underlying page by the operation of said switch; and electrical wiring means extending from said housing to the insert for each of said pages, said wiring means operatively connecting one or more of said switches to one or more of said voice chips.

2. The book of claim 1 wherein said inserts are sufficiently rigid so that said inserts can be used to push said switches into position in said channels.

3. A talking book comprising:

a book with a plurality of pages of printed material, each of said pages having a core overlain with informational sheets;

each said page having one or more pressure sensitive switches carried by an insert in a channel in said core in a location consistent with printed material on the informational sheet for such page, said channel extending laterally from a binding-facing edge of said core;

electronic voice chips and a speaker operatively connected thereto; and means for operatively connecting said voice chips to one of said pressure sensitive switches.

4. The talking book of claim 3 wherein an activating surface of each of said pressure sensitive switches is covered by the informational sheet for the page in which said switch is contained.

5. The talking book of claim 3 wherein an activating surface of said pressure switches protrudes from the core of the page in which said switch is contained.

6. The talking book of claim 3 wherein at least one of said inserts carries two of said pressure sensitive switches, one of said switches being operated from the front of the page in which the insert is located and the other being operated from the back of said page.

7. The talking book of claim 3 further comprising an LED in said core for backlighting one of said switches.

8. A talking book comprising:

a book with a plurality of pages of printed material, front and back covers and a binding for said pages and said covers;

speaker means, voice chips and a power source carried by said book in a location other than in said pages, said chips being operatively connected to said speaker means and said power source supplying operating power to said chips and to said speaker means;

one or more switches carried by an insert in a channel extending laterally into at least one of said pages in a location consistent with the printed material on such page in a configuration that reduces the likelihood of inadvertent activation of a switch on an underlying page; and, means for operatively connecting each of said chips to one of said switches.

9. A method of making a talking book having an electronics system comprising the steps of:

(a) providing a plurality of pages, each of said pages having a core between two informational sheets, each said core having at least one aperture extending laterally from an edge and being overlain by said informational sheets;

(b) providing a correspondingly shaped insert for each said aperture, each said insert carrying at least one pressure sensitive switch for activating the electronics system; and (c) inserting each said insert into its corresponding aperture so that said pressure sensitive switch is in a location consistent with printed material on one of said informational sheets.

10. The method of claim 9 wherein each said insert is inserted after said informational sheets have been overlain.

11. The method of claim 9 wherein at least one said insert has approximately the same thickness as said core.

12. The method of claim 11 wherein said one insert has two said pressure sensitive switches, each being in a location consistent with printed material on a different one of said informational sheets.

13. The method of claim 9 wherein each said aperture extends from an edge of said core adjacent a binding of the book to which said plurality of pages are joined.

14. The method of claim 13 further comprising the steps of attaching the electronics system to a back cover of the book and extending a wire from said pressure sensitive switch into said back cover and to the electronics system.

15. The method of claim 14 further comprising the step of providing a groove in each said insert for said wire.

16. The method of claim 9 further comprising the step of providing an opening in said informational sheet corresponding to the location of said pressure sensitive switch.

17. The method of claim 16 further comprising the step of elevating said pressure sensitive switch in said opening.

18. In a method of making a children's talking book in which an electronics device is activated by operation of a pressure sensitive switch in a page of the book, the improvement comprising the steps of: providing a lateral channel in a page accessible from a binding-facing edge of the page and inserting into the channel a channel-filling insert carrying a pressure sensitive switch so that the pressure sensitive switch is in a location corresponding to printed material on the page.

19. The method of claim 18 wherein said insert carries two said pressure sensitive switches, each in a location corresponding to printed material on a different side of the page.

20. The method of claim 18 further comprising the step of elevating said pressure sensitive switch.

* * * * *